(No Model.) 4 Sheets—Sheet 1.

W. P. BETTENDORF.
MACHINE FOR SECURING SPOKES IN WHEELS.

No. 335,882. Patented Feb. 9, 1886.

Fig. 1.

Witnesses:
Frank J. Blanchard
Albert H. Adams

Inventor:
William P. Bettendorf
By West & Bond
Attorneys.

(No Model.) 4 Sheets—Sheet 3.
W. P. BETTENDORF.
MACHINE FOR SECURING SPOKES IN WHEELS.

No. 335,882. Patented Feb. 9, 1886.

(No Model.) 4 Sheets—Sheet 4.

W. P. BETTENDORF.
MACHINE FOR SECURING SPOKES IN WHEELS.

No. 335,882. Patented Feb. 9, 1886.

Witnesses:
Frank J. Blanchard
Albert H. Adams.

Inventor:
William P. Bettendorf
By West & Bond
Attorneys.

UNITED STATES PATENT OFFICE.

WILLIAM P. BETTENDORF, OF PERU, ILLINOIS.

MACHINE FOR SECURING SPOKES IN WHEELS.

SPECIFICATION forming part of Letters Patent No. 335,882, dated February 9, 1886.

Application filed December 30, 1884. Serial No. 151,611. (No model.)

*To all whom it may concern:*

Be it known that I, WILLIAM P. BETTENDORF, residing at Peru, in the county of La Salle and State of Illinois, and a citizen of the United States, have invented certain new and useful Improvements in Machines for Securing Spokes in the Hubs and Tires of Wheels, of which the following is a full description, reference being had to the accompanying drawings, in which—

The object of this invention is to construct a machine by which spokes can be secured in the hub and rim by forming a rivet or head and a bead or flange on the interior and exterior of the hub and tire; and its nature consists in the several parts and combinations of parts hereinafter described, and pointed out in the claims as new.

Figure 1:
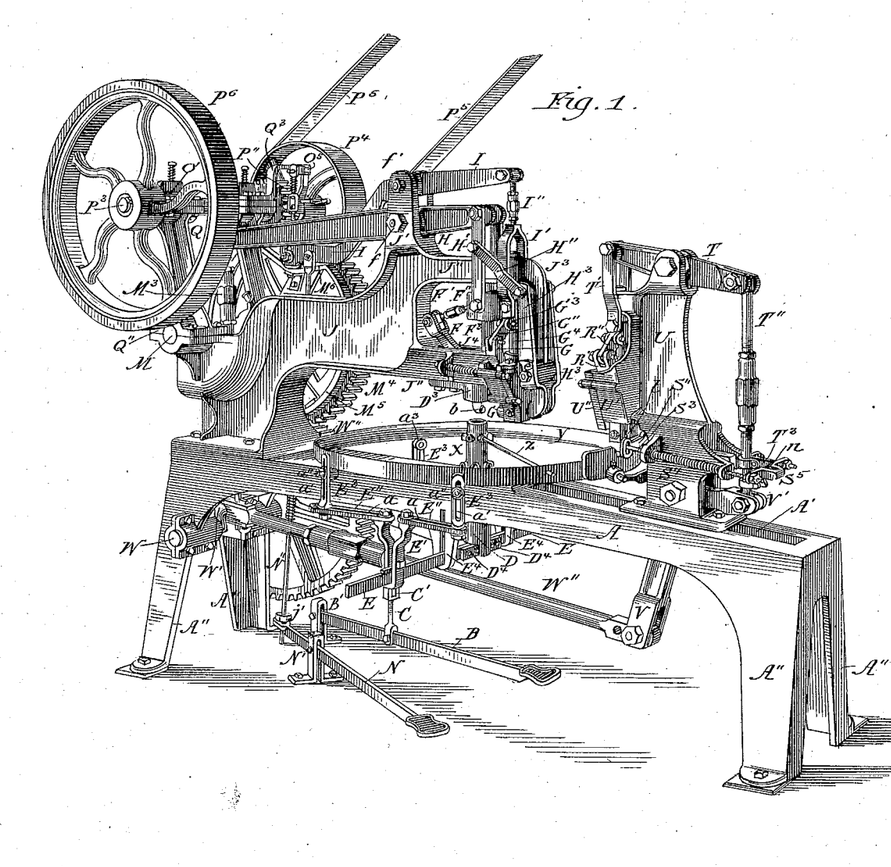
Figure 1 is a perspective view showing the complete machine with the hub, tire, and one spoke in position for the insertion of a spoke before the riveting operation is commenced.

In the drawings, A represents the bed or support, having therein at one end a vertical slot, A', as shown in Fig. 1, to receive and hold the mechanism for securing the spoke in the rim or tire, which bed or support A is supported on suitable legs, A''.

B is a foot-treadle, pivotally supported at one end in a pendant or upright, B', and located below the bed A in such position as to be operated by the foot of the attendant.

C is a rod, one end of which, as shown, is forked and pivotally connected to the foot-treadle B. The other end is provided with a screw-thread to enter a swivel or turn-buckle, C', which receives the end of a connecting link or strap, C'', attached to the end of a lever, C³, which lever is pivotally supported in a hanger, C⁴, attached to the bed or support A by a bolt, C⁵, so that as the foot-treadle B is carried down the outer end of the lever C³ will be carried down, raising its inner end, and the degree of movement of the lever C³ is regulated through the turn-buckle C'.

Figure 6:
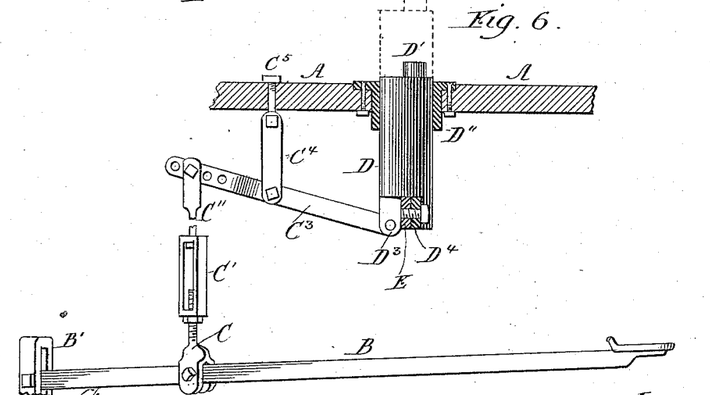
Fig. 6, an enlarged detail showing the devices for raising the hub in position for the heading-tools to operate on the spoke.

D is a spindle having in its upper end an adjustable projection, D', which forms a steady-pin for the hub. The end of the spindle D has a slot and the projection D' a stem to enter the slot, with a fastening-nut thereon, by which it can be set at different points in relation to the center of the spindle to properly center wheels of different diameters. This spindle is supported and slides up and down in a box, D'', fastened to the bed-plate A, as shown in Fig. 6, and the lower end of the spindle is provided with ears D³, between which is pivoted the inner end of the lever C³, so that by operating the lever the spindle D is raised and lowered. This lower end of the spindle D is provided with projecting ears D⁴, cast or formed therewith, as shown in Fig. 1.

E represents arms, one bolted or otherwise firmly secured to the ears D⁴ and extending out from the spindle D on opposite sides. Each arm lies in a slotted support or yoke, E', and is held in position by a bolt and key, the key being for the purpose of furnishing a long bearing to prevent rocking on the bolt. The arms of each yoke have attached to their upper end by a bolt a bar, E″, in which is a longitudinal slot, $a$, by which the bar can be adjusted on the yoke, and each bar E″ has secured thereto in the slot $a$ a vertical bar, E³, in which is a slot, $a'$, and through which slot passes the stem of a bolt, $a''$, which carries an anti-friction roller, $a^3$. The bars E″ can be adjusted and turned, and the bars or standards E³ can be adjusted in the slots $a$, and the anti-friction rollers $a^3$ are adjusted in the slots $a'$, to furnish a support for tires or rims of different diameters. These pieces E, E′, E″, and E³ form a support on which the tire rests, which support can be readily changed to suit tires of different diameters, the tire resting on the anti-friction rollers $a^3$, so that it can be readily revolved, and this support is to be adjusted in such relation with the hub as to bring the hub at the center of the tire, which can be done by raising or lowering the anti-friction rollers $a^3$, and, as the tire-support is carried from the spindle D, it will be seen that when the spindle is raised the tire-support will also be raised, the result being that the hub and tire are both raised in unison. As shown there are two bars, E, each of which carries a yoke, E′, and each yoke carries two bars, E″, each of which has a standard or bar, E³, carrying a roller, $a^3$, furnishing four points of support for the tire, by which the tire will be held up, and at the same time is free to be turned or rotated.

Figures 5, 7:
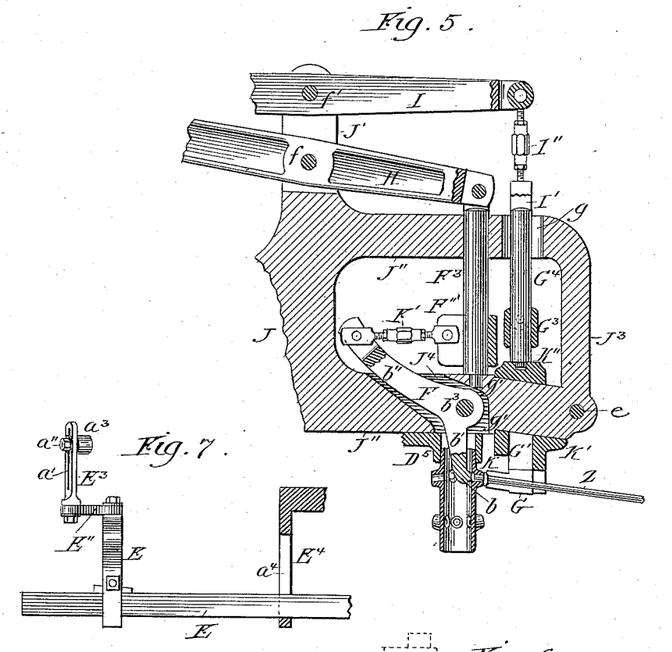
Fig. 5, an enlarged detail in section of the head carrying the devices for forming the head or rivet on the interior of the hub.
Fig. 7, an enlarged detail showing the devices for raising the tire or rim.

F is a lever having a short arm, $b'$, and a long arm, $b''$, and pivotally supported on a pin or bolt, $b^3$. The short arm $b'$ has at its lower end a projection, $b$, to engage the end of a spoke and form a head, which projection may have its end face countersunk, as shown in Fig. 5, or be otherwise formed so long as it will act and engage with and upset the end of the spoke to form a head. The long arm $b''$ is pivotally connected at its top end with the end of a connecting rod or pitman, F′, which rod or pitman, as shown, is of a form that can be lengthened and shortened to give a greater or less degree of pressure for the projection $b$ on the end of the spoke. This rod or pitman F′ at its other end is pivotally connected to a sliding block or box, F″, which encircles a guide-rod, F³, standing vertical, and by which a vertical movement of the block or box is insured.

G is the die or clamp, formed of two blocks or pieces each having a semicircular hole, which, when the two are together, forms a hole, $c$, corresponding in diameter to that of the spoke to be operated on, and the forward end or end adjacent to the hub has, as shown, a countersink therein, to give the exterior of the bead or flange formed on the spoke a rounded or beveled outline, and the hole $c$ in the die or clamp for the reception of the body of the spoke is inclined so as to stand with the spoke to center the tire or rim, as shown in Fig. 5, and the amount or degree of inclination will be one to correspond to the amount of stagger to be given the spokes. Each head or block for the die or clamp G is recessed in the lower end of a lever, G′, and locked therein by a set-screw, $c'$, and each lever G′ is pivotally supported by a suitable pin or bolt, $d$, so that the ends carrying the die or clamp can be moved toward each other to clamp the spoke in the opening $c$, and from each other to open the die or clamp to allow the spoke to pass up into the hole $c$ or out therefrom. The upper end of the levers G′ are pivotally connected to the ends of levers G″, the other ends of which are pivotally connected to a sliding block or head, G³, which encircles a guide-rod, G⁴, by which the block or box is supported and allowed to have free vertical movement. The levers and block or head act on the toggle principle.

Figures 2, 3, 4:
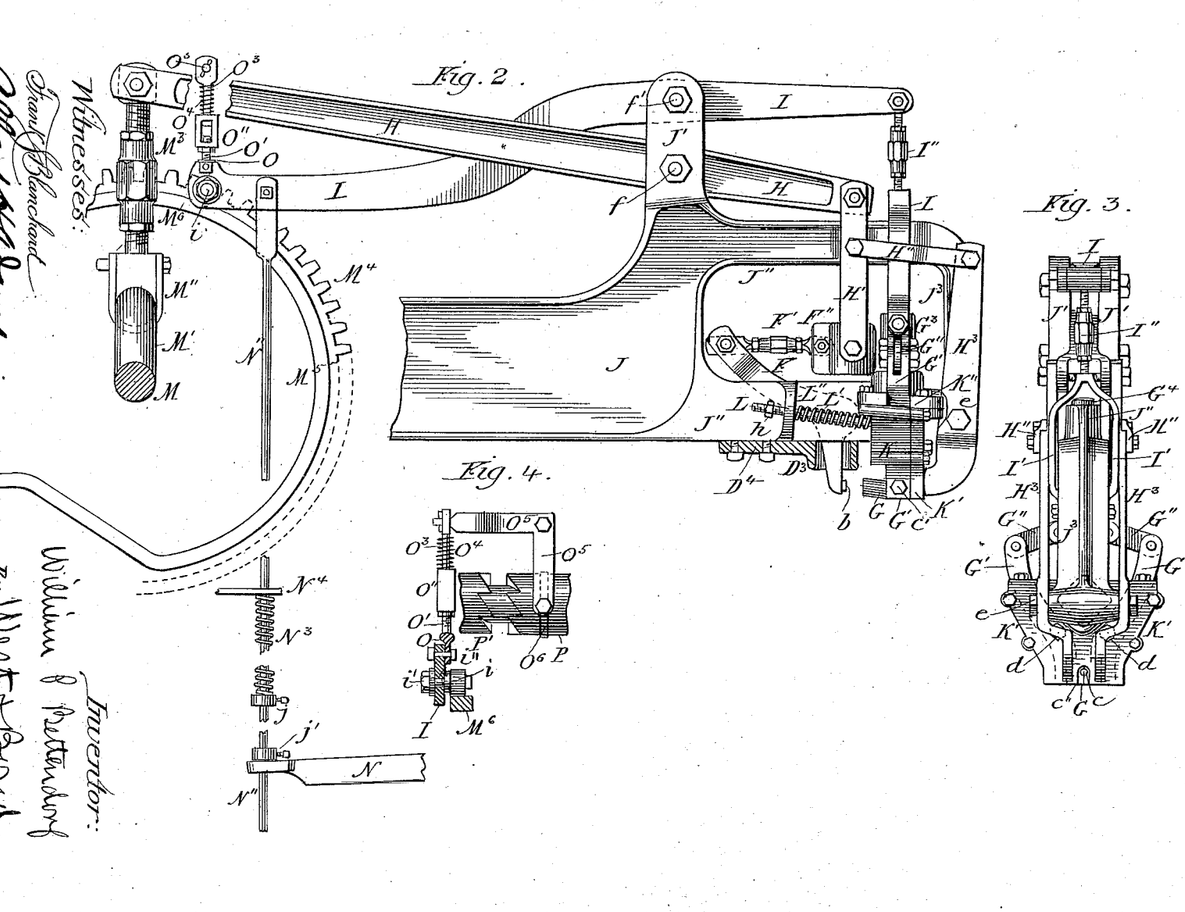
Fig. 2, an enlarged detail, being a side elevation of the parts shown, showing the devices for clamping the spokes and riveting the end in the hub.
Fig. 3, an enlarged detail, being an end elevation of the clamping-die and the levers for operating the same, and by which the spoke is clamped and held on the exterior of the hub to form the bead or flange.
Fig. 4, an enlarged detail showing the clutch and devices for operating the same, by which the driving mechanism is connected and disconnected.

H is a lever, to the forward end of which is pivotally connected the upper ends of straps H′, which straps run down and are pivotally connected to the sides of the block or box F″. This lever H is pivotally mounted or supported on a suitable pin or bolt, $f$, and furnishes the means through the connecting-straps H′ for operating the block or box F″ to move the lower arm, $b'$, of the lever F and cause the projection $b$ to act and form the head on the end of the spoke within the hub. To the straps H′ are pivotally connected straps H″, the other ends of which are pivotally connected to levers H³, which levers are supported on a pin or bolt, $e$, and their lower ends are arranged to engage the end face of the sliding box or support which carries the die or clamp G and its operating mechanism, as shown in Figs. 2 and 3. The depression of the end of the lever H to advance the lower arm, $b'$, of the lever F carries down the ends of the straps H″, attached to the straps H′, and this movement will force out the upper ends of the levers H³, causing their lower ends to engage the sliding box or head supporting the die or clamp G and move such die or clamp toward the hub.

I is a lever, pivotally mounted on a bolt or pin, $f'$, and to the end of which is pivotally connected a rod or pitman, I″, attached to the upper end of straps I′, which straps at their lower ends are attached to the sliding block or box G³, and, as shown, the connection I″ is made adjustable, to give the proper length of movement to operate the toggle-levers and open and close the die or clamp G. The upward movement of the end of the lever I through the straps I′ and connection I″ raises the block or box G³ to throw the lower ends of the levers G′ apart and open the die or clamp, and the downward movement of the end of the lever I acts to move the box G³ down to close the die or clamp through the levers G′ and G″.

J is a support attached at its rear end by bolts or otherwise to the rear end of the bed or support A in such manner as to leave a clear space between its under side and the top of the bed for the insertion of the rim and hub. The top of this support J, near its forward end, has upwardly-projecting ears J', between which is pivoted the levers H and I, and the forward end of the support has a top and bottom piece, J'', connected by the end piece, J³, the several parts being cast in one piece or otherwise suitably connected together. The bottom piece J'', of the support has therein a vertical slot, J⁴, in which is located the lever F, and between the top and bottom parts J'' is left a space for the movement of the sliding block F'' and the end of the lever F, as shown in Fig. 5. The guide rod or spindle F³ for the sliding block F'' has its lower end secured in the lower piece J'', its upper end passing up into and through the upper piece J'', and the upper end of the guide rod or spindle G⁴ is located in a slot, $g$, in the upper piece J'', which slot is sufficiently elongated to allow of the forward and backward movement of the die or clamp G in the form of construction shown in Fig. 5.

K is a box or support mounted on the lower arm or piece J'', at the forward end thereof, and held in place in the form of construction shown by an end plate, K', bolted or otherwise secured to the end face of K, and a top plate, K'', bolted or otherwise secured to the top face of K, so that when the parts are together the box or support K will be held in place and free to slide forward and back, and, as shown, the limit of forward movement is stopped by shoulders $g'$, formed on the arm J''; but the limit of movement could be controlled by other means, this stop being of a secondary nature, as the actual limit of forward movement is stopped by the bead or flange formed on the spokes at the exterior of the hub. The cap-plate K'' carries the lower end of the guide rod or spindle G⁴, the upper end of which is in the slot $g$. The levers G' are located in the box K, the pivot $d$, which carries them, passing through the box and end plate, K', so that as the box is moved forward and back the levers will also move forward and back, and these levers carrying the die or clamp G, such die or clamp will be advanced or receded as the box moves forward or back, and the forward movement of the box is accomplished by the levers H³, the lower ends of which bear against the face-plate K'. The face-plate K' has a slot, $c''$, of sufficient width for the passage of the body of the spoke, which slot is located in line with the opening $c$ when the die is closed, but is of greater width than the diameter of the hole, so as to insure the passage of the spoke into the hole. The interior of the box K is so formed as to permit of the necessary movements of the levers G' to open and close the die or clamp.

L is a rod one end of which is screwed into or otherwise secured to the inner face of the box K, the other end passing through the guide-ear L'' on the side of the lower arm J'', and having thereon a nut, $h$, and around this rod between the ear L'' and the box K is a coiled spring, L', which spring acts to move the box back after it has been advanced by the levers H³, the nut $h^3$ forming a stop to limit the backward movement in the form of construction shown. A rod with a spring can be used for each side of the box K, an ear corresponding to L'' being formed on the opposite side of J'' to furnish a guide for the rod and a backing for the spring.

M is a shaft provided with a crank, M', to which is connected by a suitable strap, M'', or otherwise, a rod, M³, which, as shown, is formed so as to be lengthened and shortened, which rod is pivotally connected to the rear end of the lever H. The shaft M has mounted on one end a gear-wheel, M⁴, on the side of which is a flange or track, one portion, M⁵, of which is a true circle, while the remaining portion M⁶ is depressed, the depressed portion being about one-sixteenth of the entire circumference.

N is a foot-treadle pivotally supported in an upright or standard N', and the forward end of which receives the lower end of a rod, N'', on which is a collar, $j$, against which the end of the lever comes in contact. The upper end of the rod N'' is pivotally attached to the rear end of the lever I, and this rod, as shown, passes through a guide-bar, N⁴, between which and a collar, $j$, on the rod is located a coiled spring, N³, which spring acts to throw the rod down after it has been raised by the foot-treadle N.

O is a plate or head attached to the rear end of the lever I by a bolt, $i''$, and having on its upper end a screw-threaded stem, O', to receive a turn-buckle, O'', the upper end of which receives the end of a stem, O³, between the head of which and the end of the turn-buckle is located a coiled spring, O⁴, and the head of the stem O³ receives the end of one arm of a bell-crank or angle-lever, O⁵, the other arm of which engages with a sliding collar, forming one portion of a clutch. Attached to the end of the lever is a bolt, $i'$, which bolt carries an anti-friction roller, $i$, which roller, when the parts are together, runs on the cam or cam-track M⁵ M⁶. The turn-buckle O'' permits of an adjustment by which the throw of the lever I is regulated for the bite of the die or clamp, and the foot-treadle N and rod N'' will lift the end of the lever I sufficiently to cause the bell-crank lever O⁵ to act and throw the clutch into engagement, and the point at which the clutch is engaged is when the body of the spoke is within the hole $c$ in the die G, and if the spoke is not properly in the hole $c$ the lever I cannot be raised to a point where the clutch will be engaged, and after the clutch is bottomed the roller $i$ is in position to mount the incline of the depressed portion M⁶ of the track, and thereby raise the end of the lever I still farther, and cause the clamp or die to bite on the spoke to the extent required to firmly hold the spoke for the operation of securing it in the hub, and this further raising of the end of the lever I is permitted by the spring O⁴ without affecting the devices for operating the clutch to an extent to cause injurious effects.

P is the movable section of the clutch, having a circumferential groove to receive a pin in a yoke, O⁶, which partly encircles the section, and is attached to the lower end of the bell-crank lever O⁵, so that the movement of such lever will move the clutch into and out of engagement. This clutch-section engages with a corresponding clutch-section, P′, formed with or attached to a small gear-wheel, p″, which meshes with the large gear-wheel M⁴, and this gear-wheel and the clutch are mounted on a shaft, P³, one end of which has a pulley, P⁴, thereon, driven, as shown, by a belt, P⁵, and the other end carries a fly-wheel, P⁶.
When the clutch is disengaged, the shaft P³ will rotate without imparting rotation to the gear-wheel P″, and the engagement of the clutch-sections P and P′ connects the gear-wheel with its shaft, so as to rotate the gear and drive the gear M⁴, and the crank-shaft M, on which the gear M⁴ is located.

Q represents standards running up from the rear end of the support J, and having mounted in suitable boxes, Q′, on their upper ends the shaft P³, and, as shown, the lower ends of these standards are made to act as half-boxes Q″ for the shaft M, the other half-box being formed in the support J. As shown, the arm Q³ is attached to the upper end of one of the standards Q, which arm Q³ is bent up and out, and forms the support to which the bell-crank lever O⁵ is pivoted.

R is the die or clamp for securing the spoke inside of the tire. This die or clamp is formed of two blocks or heads, each having therein a semicircular hole, which, when the die is in position for use, forms a hole, l, in which the spoke is held, and each block is located in a recess in the lower end of a lever, R′, and is held in position by a set-screw, l′. Each lever R′ is pivotally mounted on a pin or bolt, k, and their upper ends are connected with the ends of levers R″, which are pivotally attached to a block or box, R³, which encircles a guide-rod, R⁴, so that the block has free vertical movement on the guide-rod.

Figure 8:
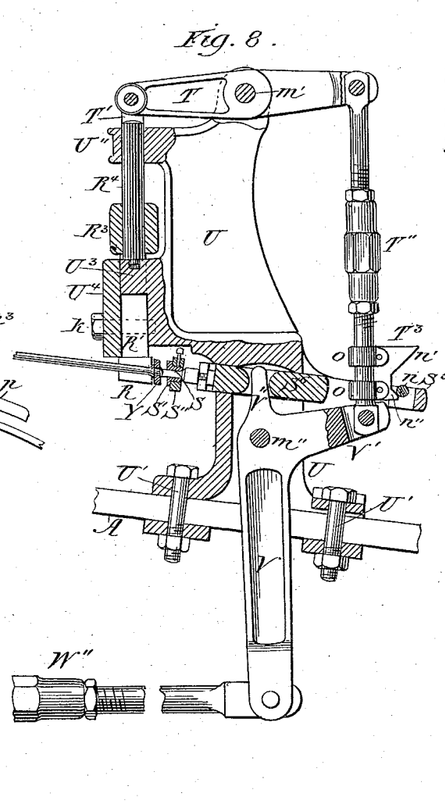
Fig. 8, an enlarged detail, partly in section, showing the devices for clamping the spoke and securing the end thereof in the rim or tire.
Figures 9, 10, 11:
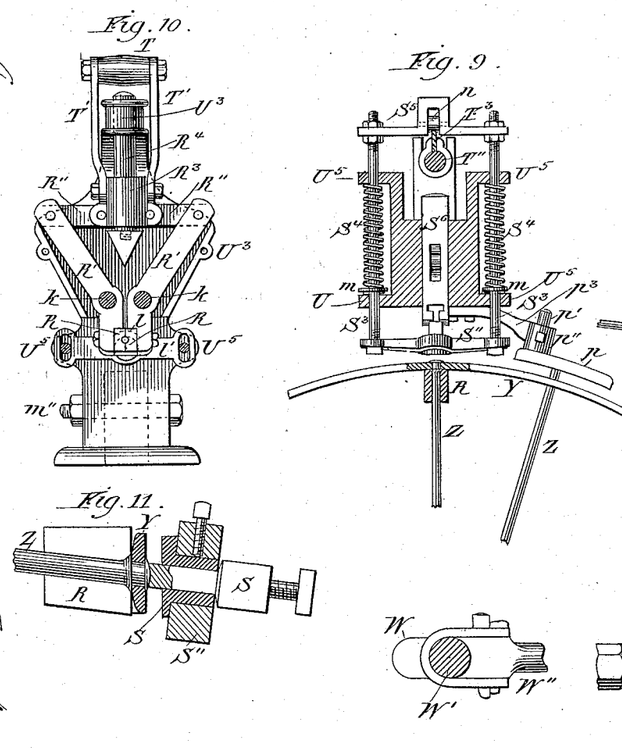
Fig. 9, an enlarged detail, being a cross-section through the head of Fig. 8, showing the devices by which the insertion of the spoke is controlled and the length of projection of the ends secured.
Fig. 10, an enlarged detail, being an end elevation showing the clamping-dies and levers for operating the same for holding the spoke and forming the bead or flange on the inside of the tire.
Fig. 11, an enlarged detail of the dies, punch, and guide for forming the bead or flange and the head at the tire end of the spoke.

S is a punch the acting end of which, as shown, is countersunk or depressed to form a rounded head, but it could be otherwise formed. The body of this punch runs in a guide, S′, which guide is located in a support, S″, the ends of which are carried by rods S³, one for each end of the bar S″, and each rod is provided with a collar, m, to receive a spring, S⁴, the other end of which is in contact with one of the supports or guides for the rod. The spring encircles the rod and acts on the collar m to throw the rod forward, advancing the bar S″ and the guide S′, and holding the guide in contact with the exterior face of the tire, and this guide is so located and arranged in relation to the end of the spoke as to form in effect a continuation of the spoke-hole in the tire, by which the projecting end will be held against spreading, while the flange or bead around the spoke against the interior of the tire is being formed. The upsetter or punch S is secured in the forward end of a sliding block, S⁶, and the rear ends of the rods S⁴ are secured to a cross-piece, S⁵, having a slot therein, in which slot is located an anti-friction roller, n, as shown in Figs. 8 and 9.

T is a lever pivotally mounted on a pin or bolt, m′, and having pivotally connected to the forward end thereof straps T′, the lower ends of which are attached to the block R³, and the other end of this lever T has pivotally attached thereto a connecting-rod, T″, which, as shown, is made up in sections, so as to be lengthened or shortened for adjusting purposes. The lower end of this rod T″ has attached thereto by collars o a plate, T³, having on its rear edge inclined faces n′ and n″, so located and arranged as to engage with the roller n, the engagement of the roller n with the incline n′ carrying back the bar S⁵, and with it the rods S³ and bar S″ and guide S′, and the engagement of the roller by the incline n″ drawing back these same parts to a limited extent, and only sufficient to carry back the guide S′ from the tire to leave a clear space for the end of the punch S to act and form the head on the end of the spoke on the exterior of the tire.

U is a support the lower end of which rests on top of the bed A, and is secured thereto by bolts U′, which bolts pass through the slot A′, and by means of which the position of the support U can be changed to suit the diameter of the wheel. This support at its upper end has a projecting portion, U″, which receives the upper end of the guide-rod R⁴, and the lower end of this guide-rod enters a projecting portion, U³, which portion also forms a support for the levers R′, and, as shown, a side piece or cap, U⁴, completes the casing or box by being bolted to the main portion U³. The interior of the box U³ has an opening to permit of the movement of the levers R′ to open and close the die or clamp, as shown in Fig. 10. Each side of the support U, below the box U³, is provided with ears U⁵, which support and guide the rods S³, as shown in Figs. 9 and 10, and the body of the support U has a transverse recess, in which the block S⁶ is located and slides back and forth, and, as shown, the base of the support U is left open to receive the lever for operating the devices.

V is a lever having an arm, V′, to which is pivotally connected the lower end of the connecting-rod T″ and an arm, V″, which enters a hole in the sliding block S⁶. The lever V is pivotally mounted on a bolt or pin, m″, in the open base of the support U in such manner as to have the arm V″ engage the sliding block, while the body of the lever extends below the bed or support A.

W is a shaft, having a crank, W′, and supported in suitable bearings on the rear legs of the bed in the form of construction shown. The crank W' has connected therewith by a suitable strap a pitman or connecting-rod, W''', the other end of which is pivotally connected to the lower end of the lever V, and, as shown, the pitman or connecting-rod W''' is so formed as to be adjusted to suit different-sized wheels.

X is the hub into which the spokes are to be inserted and secured.

Y is the rim or tire of the wheel; Z, the spokes. The length of the spoke is to be one for the diameter of wheel with projection sufficient to form the heads at both ends, and the spoke is inserted by passing one end into the hub and then passing the other end through the tire, or vice versa, and the rim and hub are turned around to bring the spoke in line with the dies or clamps G R, to pass into the openings of the dies as the hub and tire are raised, and, in order to insure a proper projection for the spoke ends, a guide, $p$, is provided, which guide is attached to a socket, $p''$, by a pin, $p'$, the socket being formed on the end of an arm, $p^3$, which is bolted or otherwise secured to the front face of the support U, and the pin $p'$ is secured in the socket by a set-screw or otherwise, so that the guide can be adjusted to leave a greater or less space between its inner face and the tire to govern the amount of end projection of the spoke.

The operation is as follows: The turn-buckle C' is adjusted to give the lever $C^3$ the proper throw to raise the spindle D to bring the hub X, carried by the spindle, in position for the spoke-openings in one end thereof to come in line with the projection $b$ on the arm $b'$ of the lever F, and the bars or arms $E''$ $E^3$ and rollers $a^3$ are adjusted to suit the diameter of the tire and have the tire rest firmly on the rollers $a^3$. The hub is placed on the spindle D, with the centering-pin D' adjusted properly for the size of tire to locate the hub at the center, and the tire is placed on the supporting-rollers $a^3$ to bring a spoke-hole therein in line with the coinciding spoke-hole in the hub. A spoke heated at both ends in a suitable furnace is placed in position, one end to enter the hub-hole and the other the tire-hole, and the hub and tire are revolved to bring the inserted spoke in line with the opening in the jaws G and R, the rotating of the tire causing the end of the spoke which projects beyond the tire to pass the gage-plate $p$, by which the amount of projection is secured. The operator then places his foot on the treadle B, raising the hub-spindle D and tire-carrier with the inserted spoke, passing the upper end of the hub into the guide or holder $D^5$ and passing the spoke into the opening $c$ in the dies G and the opening $l$ in the dies R, bringing the hub end of the spoke in line with the projection $b$ and the tire end of the spoke in line with the punch S, ready for the operation of securing the spoke in the hub and tire. The operator, when the spoke is in the die-openings $c$ and $l$, places his foot on the lever N and forces the end of the lever down, raising the rod N'', and this movement of the rod raises the rear end of the lever I, forcing down the forward end, carrying down the slide or box $G^3$, operating the toggle-levers G' and G'' to close the jaw or clamp G around the spoke outside of the hub, producing the preliminary bite on the spoke, which bite, however, is not sufficient to hold the spoke against the pressure of the lever F, to form the head on the interior end of the spoke and the bead or flange on the exterior of the hub, and this bite will occur as the roller $i$ on the end of the lever I begins to pass up the inclined portion of the depression $M^6$ in the guide or track on the wheel $M^4$, on which the roller travels, and at the same time the clutch P P' is thrown into engagement, connecting the gear P'' with the shaft $P^3$ and imparting rotation to the gear $M^4$, which rotation of the gear-wheel $M^4$ carries with it the track $M^5$ $M^6$, on which the roller $i$ rides, so that as the track rotates and passes under the roller the lifting action of the upward-inclined portion of $M^6$ will raise the end of the lever I, which movement will continue until the roller has reached and passes the apex of the incline, at which time the forward end of the lever I has been depressed sufficiently far to cause the die or clamp G to bite the spoke Z with sufficient power to prevent end movement thereof, at which time the crank M' has commenced its upward movement, raising the rear end of the lever H and depressing the forward end of such lever, which movement carries down the slide or block F''' and the rear end of the bars H'' through the straps or bars H', forcing down the upper end of the lever F and forcing out the upper end of the lever $H^3$, causing the arm $b'$ to advance toward the end of the spoke and the box K, with the die or clamp G, to advance toward the hub, and the engagement of the projection $b$ with the end of the spoke forms a rivet or head on the interior of the hub, and at the same time the advance of the die or clamp forms a head or flange on the exterior of the hub, so that the spoke is secured in the hub by a rivet or head on its interior end and a bead or flange on its exterior adjacent to the boss for the spoke on the hub or the exterior of the hub. This completes the securing of the spoke at the hub end in the hub; but before this operation is completed the crank W' commences to descend, this crank and the crank M' being adjusted to work at different centers, and the descent of the crank W' carries forward the connecting-rod W'', operating the lever V to advance the arm V'' and raise the arm V' of such lever. The advance of the arm V'' carries forward the slide $S^6$, and with it the punch S, and the raising of the arm V' carries up the link T'', raising the forward end of the lever T and throwing down the rear end, carrying down the slide or box $R^3$ through the straps R⁴, and causing the toggle-levers R' and R" to act and close the jaw or clamp R and firmly bite the spoke, and as these parts commence operation the guide S' is advanced by the action of the springs S³ as the incline n' passes over the roller n, bringing the forward face of the guide in contact with the exterior face of the tire, with the end of the spoke in the guide, so that the guide forms in effect a continuation of the spoke-opening, by which the spoke end will be held from being crushed by the advance of the punch S, and a flange or bead will be formed on the interior of the tire by the action of the die or clamp R, and when this bead or flange is formed the guide S' will be drawn back somewhat by the action of the incline n" and roller n, leaving the punch free to act and force down the end of the spoke on the exterior of the tire, forming a rivet or head thereon as the punch is advanced by the movement of the lever V, which operation is completed as the crank W' reaches the limit of its downward movement, so that as the crank ascends the rod W" will draw the lever V back, receding the block S⁶ and the punch S, and at the same time raising the rear end of the lever T and opening the clamp or die R, before which time the projection b has been receded and the die or clamp G opened by the upward movement of the forward end of the lever H, releasing the spoke at the hub end so that when released at the tire end the spoke is secured in both the hub and tire, and the hub and tire can be dropped to receive another spoke, which is inserted and brought around to center the dies or clamps and the hub and tire raised, and the operation again repeated, and so on until all the spokes have been inserted and secured on one side, when the hub is reversed and the spokes for the other side are secured in the hub and the tire in the same manner. The head K, carrying the die or clamp G and the operating mechanism therefor, is receded as the forward end of the lever H is raised by the action of the springs L in the form of construction shown, and when the limit of upward movement of the lever H is reached the head has been receded, bringing the die or clamp into its normal position and open, ready for the insertion of the next spoke to be acted on, and at the same time the die or clamp I has been opened by the upward movement of the lever T and the punch S retracted by the backward movement of the slide S⁶, the guide S' being retracted by the action of the incline n' passing down on the roller n as the connecting-rod T" descends, contracting the springs S³, so that as the incline n' passes up on the roller n as the connecting-rod T" is raised the springs can act and advance the guide. The operation of securing the spoke both into the hub and into the tire is not precisely simultaneous, but is approximately so, producing in effect a nearly continuous operation. The lever H is at the limit of its upward movement to withdraw the arm b' and die or clamp G as the circular portion M⁵ of the track passes from underneath the roller i and the downward incline of the depressed portion M⁶ reaches and receives the roller i, allowing the rear end of the lever I to drop slightly, raising the forward end, and, through the connecting-rod I" and straps I', sliding block G³, and toggle-levers G' and G", opening the die or clamp to receive the next spoke. As shown, the arm b' and the die or clamp G are both advanced simultaneously, and it is evident that either might be advanced, the other remaining stationary—as, for instance, a stop-block could be placed behind the sliding box K when at the limit of the forward movement, holding the die or clamp in its advanced position, so that by moving the hub through the advance of the arm b' the parts would act and form a rivet or head and a flange or bead on the spoke; or the lever F could be locked to hold the arm b' stationary, and the die or clamp be made to advance and carry with it the hub, forming the rivet or head and flange or bead on the spoke, to do which the centering-pin D' could be made to slide in the spindle D, and the guide or holder D⁵ could be dispensed with or be made to slide with the hub.

I do not claim jaws for clamping a spoke immediately outside of a hub, in combination with a mandrel which passes through the interior of said hub and forms a rest for the inner end of the spoke, whereby the spoke can be compressed longitudinally in the hub-opening by the action of the clamping-jaw and mandrel without the formation of a rivet-head on the inner end of the spoke, my invention relating solely to the use of clamping-jaws, in connection with a device acting in the interior of the hub to upset or form a rivet-head on the inner end of the spoke.

What I claim as new, and desire to secure by Letters Patent, is—

1. The combination of a movable spindle having a bearing-surface at its upper portion to receive and support a wheel-hub, with a device for entering the hub and operating to form a rivet-head on the inner end of the spoke, substantially as described.

2. A tire-carrier on which the tire is supported, and on which it is moved around to have the spokes secured therein, substantially as specified.

3. The spindle D, having the centering-pin D', and devices for raising and lowering the spindle for carrying a hub in position, substantially as and for the purpose specified.

4. The foot-treadle B, and lever C, operated from the foot-treadle, in combination with a spindle, D, having a centering-pin, D', for carrying a hub in position to have the spokes secured therein, substantially as specified.

5. The lever or foot-treadle B, and lever C³, operated from the foot-treadle, in combination with a spindle, D, centering-pin D', and guide or holder D⁵, for raising and holding a hub in position to have the spokes secured therein, substantially as specified.

6. The spindle D and devices for operating the same, in combination with a tire-supporting device supported from said spindle and moving therewith, for simultaneously raising the hub and tire to have spokes secured in position, substantially as specified.

7. The combination of bars E, yokes E', bars or supports E'' and E³, and anti-friction rollers $a^3$, for forming a support for the tire, by which the tire can be raised and turned or rotated, substantially as and for the purpose specified.

8. The combination of a hub-supporting device and a tire supporting and carrying device operating in unison to simultaneously raise a hub and tire for securing the spokes therein, substantially as specified.

9. The combination, with gripping-jaws, of a lever to enter the interior of the hub and engage a spoke end and form thereon a rivet-head, substantially as described.

10. The combination of jaws for clamping a spoke immediately outside a hub, with a device to enter the interior of said hub, and by its end impinge upon the end of the spoke to form thereon a rivet-head, substantially as described.

11. In combination with gripping-jaws, a lever having a long and short arm and pivotally supported to have the short arms act and engage a spoke end on the interior of a hub, and thus co-operate to form a rivet or head, substantially as described.

12. In combination with gripping-jaws, the projection $b$, carried by the arm $b'$ of a lever, F, for entering the interior of a hub, and thus co-operate to form a rivet or head on the spoke end, substantially as described.

13. The lever F, having an arm, $b'$, with a projection, $b$, in combination with a slide or block connected with the lever F, and devices for operating the slide or block, substantially as and for the purpose specified.

14. The lever F, having an arm, $b'$, with an end, $b$, connecting-rod F', slide or box F'', and guide-rod $F^3$, in combination with a lever, H, and links or straps H', for operating the lever F and producing the pressure to form a rivet or head on a spoke end, substantially as and for the purpose specified.

15. A die or clamp movable toward the hub, provided with a hole to receive the body of the spoke, and operating to bite the spoke on the outside of the hub to form a bead or flange thereon, substantially as described.

16. A die or clamp, G, movable toward the hub, formed of two blocks or beads, each having an inclined semicircular opening, and adapted to be opened and closed to receive and firmly bite the body of a spoke on the exterior of the hub and move to form a bead or flange thereon, substantially as specified.

17. The sectional die or clamp G, having an inclined opening, in combination with the toggle-levers G' G'' and slide or box $G^3$, for opening and closing the die or clamp, substantially as and for the purpose specified.

18. The die or clamp G, toggle-levers G' G'', and slide or box $G^3$, in combination with a lever, I, straps I', and connecting-rod I'', for opening and closing the die or clamp and producing a firm bite on the spoke, substantially as and for the purpose specified.

19. The die or clamp G, toggle-levers G' G'', slide or box $G^3$, lever I, straps I', and connection I'', in combination with a cam-trackway, $M^5$ and $M^6$, for allowing the die or clamp to open and causing it to firmly bite the spoke, substantially as and for the purpose specified.

20. The reciprocating box or support K, carrying the die or clamp G, substantially as described.

21. The sliding box or support K, carrying the die or clamp G and operating devices therefor, in combination with the levers $H^3$, links H'', and lever H, for advancing the box or support, substantially as and for the purpose specified.

22. The lever F, having an arm, $b'$, with end or projection $b$ and die or clamp G, in combination with the lever H and box or support K, and devices for operating the lever F and box or support K simultaneously, substantially as and for the purpose specified.

23. The die or clamp R, in combination with the toggle-levers R' R'' and slide or box $R^3$, for opening and closing the die or clamp and biting the body of the spoke, substantially as and for the purpose specified.

24. The die or clamp R, toggle-levers R' R'', and slide or block $R^3$, in combination with the lever T, straps T', and connecting-rod and operating mechanism for opening and closing the jaws and causing them to act on the spoke, substantially as and for the purpose specified.

25. An upsetter, S, in combination with a guide, S', to fit around the end of a spoke sufficiently close to brace the spoke to prevent the upsetter in its advance from bending or breaking down the projecting end of the spoke while a bead or flange is being formed inside a tire, substantially as described.

26. The combination of an upsetter, S, a guide, S', to brace a spoke to prevent the same from being bent or broken down, a support carrying the guide, and means for advancing the guide around a spoke while a bead is being formed thereon inside a tire, and withdrawing the guide after the formation of said bead to permit an outer bead or rivet to be formed on the spoke, substantially as described.

27. The punch S, guide S', sliding frame S'', $S^3$, and $S^5$, in combination with the spring $S^4$, roller $n$, and inclines $n'$ $n''$, for advancing and retracting the guide, substantially as and for the purpose specified.

28. The combination of a die or clamp operating to bite a spoke inside of a tire, a guide to brace a spoke to prevent it being broken down outside the tire, and an upsetter acting on the projecting end of the spoke, substantially as described.

29. The combination, with a die or clamp operating to bite a spoke adjacent to the exterior of the hub, of a lever acting to force down the end of the spoke on the interior of the hub, and punch operated to force down the end of the spoke projecting beyond the tire for securing the spoke in the hub and tire, substantially as set forth.

30. The combination, with dies or clamps acting to bite a spoke adjacent to the exterior of the hub and interior face of the tire, of a lever engaging the end of the spoke within the hub and a punch engaging the end of the spoke outside of the tire for securing spokes in the hub and tire by flanges or beads and rivets or heads, substantially as specified.

WILLIAM P. BETTENDORF.

Witnesses:
HENRY HELMIG,
W. K. HOAGLAND.